July 31, 1956    W. H. TAYLOR    2,757,273
DE-ICER
Filed Dec. 12, 1952

INVENTOR.
WILLIAM H. TAYLOR
BY
P. L. Miller
ATTORNEY

United States Patent Office 2,757,273
Patented July 31, 1956

2,757,273

DE-ICER

William H. Taylor, Akron, Ohio, assignor, by mesne assignments, to The Goodyear Tire & Rubber Company, a corporation of Ohio Application December 12, 1952, Serial No. 325,581

5 Claims. (Cl. 219—46)

This invention relates to de-icers for surfaces subject to icing conditions and more particularly to de-icers which prevent the formation of ice or melt ice which has formed on these surfaces by means of heat provided by electrical resistance heating elements.

Many types of electrical resistance heating elements have been used or proposed with varying degrees of success. Two of the most widely used types are the wire-containing heating elements and the conductive rubber heating elements with many constructions used for each type.

This invention is particularly suitable for airplane propellers and contemplates combining these two types of heating elements into an integral construction to make use of the advantages of each and minimize the disadvantages of each. It is therefore an object of this invention to provide a de-icer that contains both wire-containing and conductive rubber heating elements.

Another object of the invention is to provide a de-icer with good abrasion resistance in the most critical areas.

A still further object is to provide a construction which is easily adapted to the specific conditions encountered on a particular installation.

An important object is to provide a de-icer that has relatively stable heat emissivity over the entire surface and excellent erosion resistance in the critical areas.

A particular object of the invention is to provide a de-icer that can readily be constructed to emit different amounts of heat from different areas of the surface.

Other objects and advantages of this invention will become apparent hereinafter as the description hereof proceeds and the novel features, arrangements and combinations being clearly pointed out in the specification, as well as the claims hereunto appended.

Each particular airplane surface poses a slightly different problem and that which is a satisfactory solution for one is not for another. The speed and the altitudes at which planes fly are becoming greater each day so that the de-icing problem becomes more critical and de-icing by electrical resistance heating is being used more and more extensively. This type of de-icing equipment presents two principal problems, one, obtaining and maintaining the desired distribution of the heat over the surface, as well as the proper degree of heat emissivity, and two, obtaining good erosion resistance on the portions of the de-icer surface subjected to highly erosive actions. As the speeds increase, the dynamic balance of the various parts of the airplane structure become more critical and it is necessary that any de-icing equipment should upset this balance as little as possible.

Conductive rubber de-icers present a very smooth and good erosion-resistant surface but the resistivity of conductive rubber is subject to material variations. These variations are of such a degree that they in many instances cause the de-icer to be unusable and consequently a very difficult type of de-icer to produce satisfactorily on a commercial basis.

The wire-containing de-icer has a very stable electrical resistivity but the individual wires cause a wavy or undulating surface on the de-icer. This surface has a very poor erosion resistance and as a result, the de-icer is short-lived. In addition, the aero-dynamic balance of the aircraft part is deleteriously affected and it is very difficult to overcome this in manufacturing this type of de-icer.

Figure 1:
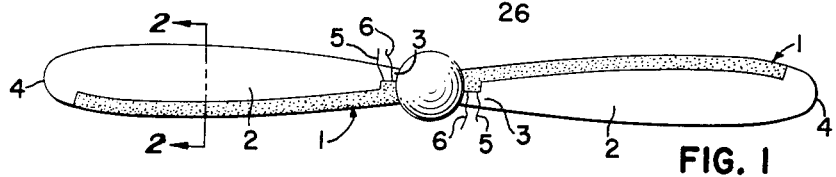
Fig. 1 is a view of de-icers mounted on the leading edge of the blades of a propeller.
Figure 2:
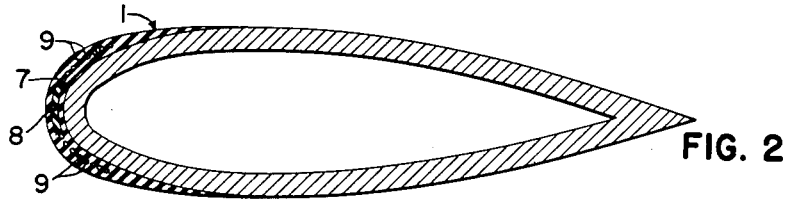
Fig. 2 is an enlarged sectional view taken along line 2—2 of Fig. 1.
Figure 3:
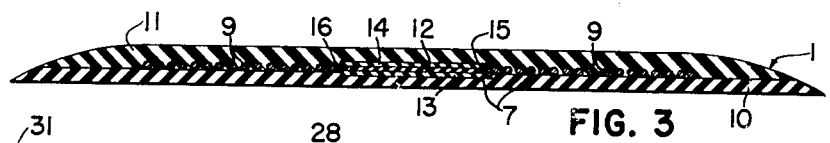
Fig. 3 is an enlarged sectional view of a typical de-icer before attachment to the propeller.

In Fig. 1, the de-icer 1 is mounted on the propeller blade 2 to substantially cover the leading edge portion and extends from the hub or shank end 3 of the blade 2 outwardly toward the tip end 4 of the blade, this being well known to those skilled in the art. The de-icer 1 extends chordwise of the propeller about the major portion of the leading edge as shown in Fig. 2 to provide de-icing on the portions of the blade subjected to icing conditions and a pair of terminal leads 5 and 6 extend from shank end of the de-icer adapted to be connected to a suitable source of electrical energy (not shown).

The de-icer 1 contains a heating unit 7 having a conductive rubber heating element 8 and a wire-containing heating element 9. Where the term "heating element" is used, it is to be understood that the heating element may be one or more individual units collectively forming the "heating elements" of either type. The conductive rubber heating element 8 preferably is positioned in the central portion of the de-icer so that when attached to the propeller 1, it will cover the leading edge portion of the blade 2. The wire-containing heating element 9 is disposed on either side of the conductive rubber heating element 8 so as to include substantially the remaining area of the de-icer and will cover the portions of the propeller blade 2 subject to icing to the rear, chordwise, of the leading edge portion. Preferably the entire heating unit 7 is encased or sheathed in layers 10 and 11 of non-conductive rubber or rubber-like material to provide respectively electrical insulation for the heating units and an erosion-resistant cover for the propeller. As shown, the edge portions of the layers 10 and 11 of de-icer 1 are shaped to a feathered edge to minimize the air resistance and effect on the dynamic balance of the propeller.

Heretofore conductive rubber has been extensively used for heat producing purposes and the preparation of conductive rubber, as well as incorporation into heating elements, is well known to those skilled in the art. The conductive rubber heating element 8 is constructed according to these well-known practices, such, for example, layer or layers 12 of conductive rubber of the desired resistance sandwiched between insulating layers 13 and 14 with parallel conductors 15 and 16 extending along oppositely disposed marginal portions of the conductive layer. Leads connected to a source of electrical energy are attached to the conductors so that current is supplied to the conductive rubber layer which causes heat to be emitted therefrom as the current passes from one conductor to the other through the conductive rubber.

The wire-containing heating elements 9 are constructed of a series of resistance wires of the desired resistance positioned parallel to each other, the opposite ends of each wire being connected to conductors of opposite polarity so that the current will pass from one conductor through the resistance wire to the other conductor, thus causing heat to be emitted from the wire. The construction of the wire-containing heating elements is well known in the art and any of the constructions may be used to form this part of the invention.

One convenient method of fabricating the completed de-icer is to position the conductive-rubber heating element 8 and the wire-containing heating element 9 on the layer 10 of insulating rubber and superposing layer 11 of insulating erosion-resistant rubber material. The entire structure is then subjected to heat and pressure so as to vulcanize and form the various parts into an integral structure. If desired the de-icer may be formed to substantially the contour of the propeller, although this is not necessary as the completed de-icer is sufficiently flexible to be mounted on the propeller without preforming. It is readily apparent that different degrees of heat may be emitted from different surface areas of the de-icer depending upon the resistance of the particular heating elements incorporated into the de-icer. This type of construction is adaptable for any of the forms of the invention as shown in Figs. 4, 5, 6 and 7. The completed structure is then mounted upon the propeller blade 2, generally by means of an adhesive or cement to hold it firmly in position on the blade, and the leads to the conductors are attached to a source of electrical power (not shown).

Figure 4:
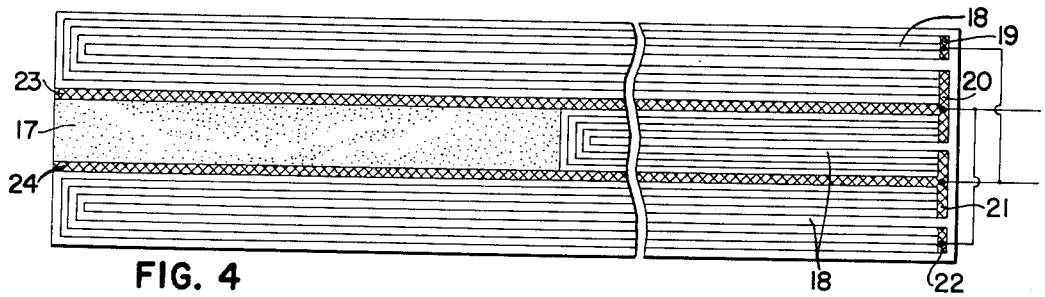
Fig. 4 is a diagrammatic plan view of one form of the invention.

Several forms of the invention are shown in Figs. 4, 5, 6 and 7, each having a conductive rubber heating element included in at least a portion of the central area (the leading edge area) of the de-icer. It is apparent that in any of the forms of the invention shown in Figs. 4, 5, 6 and 7, the transverse width of the conductive rubber heating element is substantially less than the width of the heating unit as it is preferable that the conductive rubber heating element only cover the leading edge portion of the propeller blade. In Fig. 4, the conductive rubber element 17 extends over the central portion from the tip end toward the shank end to a point substantially midway between the ends. The tip end on the propeller is subjected to the most severe icing and erosion conditions so that this particular construction provides the best erosion-resistant surface at the critical area. The wire-containing heating elements 18 as illustrated are formed of a series of concentrically arranged U-shaped resistance wires, the opposite ends of each wire being connected to bus-bars 19, 20, 21 and 22 of different polarities. The conductors 23 and 24 of the conductive rubber heating element 17 are similarly connected.

Figure 5:
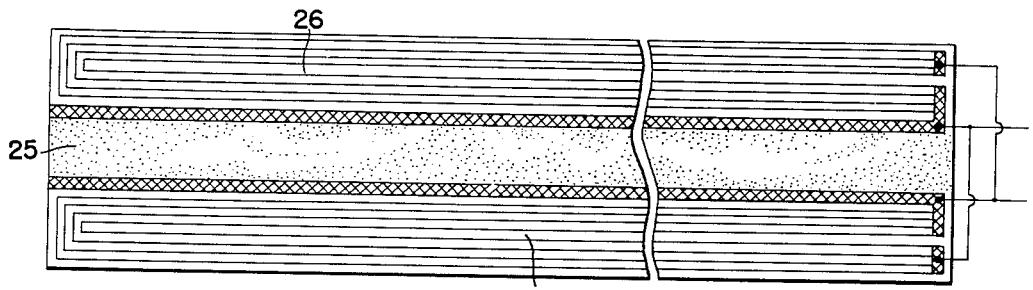
Figs. 5, 6 and 7 are diagrammatic plan views of modifications of the invention.

In the modification shown in Fig. 5, the conductive rubber heating element 25 extends along the entire de-icer in the central area between the wire-containing heating elements 26. The heating elements 26 are similar to the heating elements 18 in Fig. 4.

Figure 6:
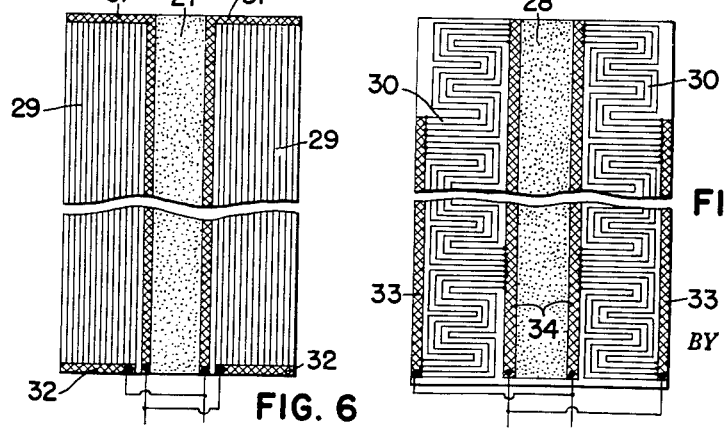
Figure 7:
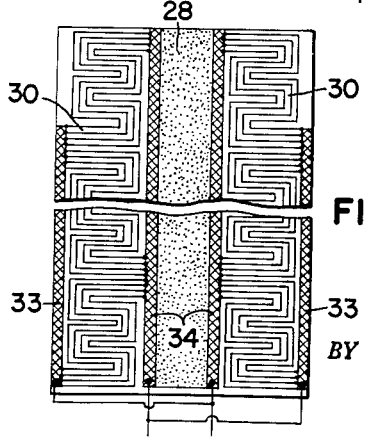

In Figs. 6 and 7, the modifications illustrated include conductive rubber heating elements 27 and 28 respectively extending substantially the entire length of the de-icer in the central area between the wire-containing heating elements 29 and 30 of slightly different construction.

In Fig. 6, the wire-containing heating elements 29 consist of a series of longitudinally extending parallel electric resistance wires connected to bus bars 31 and 32, which in turn are connected in parallel to the conductive rubber heating element 27.

In Fig. 7, the heating elements 30 consist of a series of parallel transversely extending serpentine-shaped resistance wires connected to the bus bars 33 and 34 suitably attached to a source of potential.

It will be apparent to those familiar with the art that types of wire-heating elements other than those shown and described may be used to obtain the benefits of this invention. Preferably the area of the conductive rubber heating element should not exceed approximately 33% of the de-icing area in order that the most advantageous use may be made of the invention.

By limiting the area to this extent, the portion of the de-icer that is subjected to most severe erosion is given the maximum protection of the conductive rubber heating element without materially affecting the overall resistance of the de-icer due to the variations in resistance of the conductive rubber element. The overall effect may be further reduced by the use of a conductive rubber element only on the portion of the de-icer which covers the tip end of the propeller. It will also be apparent that the breakage of one of the resistance wires does not render the entire heating element inoperative as the remainder of the element continues to function. This type of circuit is not essential but desirable to obtain the maximum life of the de-icer.

In many de-icing operations it is desirable to provide different degrees of heat output from different areas of the de-icer. It is apparent that a de-icer of this type may be readily constructed by properly choosing the resistance (the determining factor of heat emissivity) of the various heating elements that make up the heat unit for the de-icer.

While certain representative embodiments and details have been shown for the purpose of illustrating the invention, it will be apparent to those skilled in this art that various changes and modifications may be made therein without departing from the spirit and scope of the invention.

I claim:

1. An electrically heated propeller de-icer of substantially sheet form, said de-icer comprising a body of resilient rubber material having a heating unit contained therein and being adapted to be mounted upon the surface of a propeller which is subject to icing conditions; a conductive rubber heating element contained in said heating unit, the conductive rubber heating element having an area not to exceed 33% of the surface area of said unit; at least one wire-containing heating element included in said heating unit, said wire-containing heating element and said conductive rubber heating element cooperating to de-ice different portions of the surface and to form the complete heating unit; and means adapted to be connected to said heating element to supply electrical energy thereto.

2. An electrically heated propeller de-icer of substantially sheet form, said de-icer comprising a body of resilient rubber material having a heating unit contained therein and being adapted to be mounted upon the surface of a propeller which is subject to icing conditions; a conductive rubber heating element contained in said heating unit, the conductive rubber heating element having an area not to exceed 33% of the surface area of said unit; at least one wire-containing heating element included in said heating unit, said wire-containing heating element and said conductive rubber heating element cooperative to form the heating unit with each heating element de-icing different portions of the surface; terminal means on each of said heating elements adapted to be connected to a source of electrical energy to supply electrical energy to the heating elements.

3. An airplane propeller blade de-icer of substantially sheet form and having a shank end and a tip end, said de-icer comprising a body of flexible rubber material for mounting upon the leading edge of a propeller blade with the shank end of the de-icer at the shank end of the blade and the tip end of the de-icer at the tip end of the blade with said body extending about the leading edge and rearwardly on the blade; a heating unit contained in said body; said heating unit embodying a conductive rubber heating element disposed over at least a portion of the area of the body adjacent the leading edge portion of the blade, but not to exceed 33% of the total area of said heating unit, and at least one wire-containing heating element forming the remainder of the area of the heating unit, said conductive rubber heating element and said wire-containing heating element together embracing substantially the entire area of rubber body with each of said types of heating elements acting on different portions of the de-icer surface; and terminal means on each of said heating elements adapted to be connected to a source of electrical energy to supply electrical energy to said heating elements.

4. An airplane propeller blade de-icer of substantially sheet form of greater length than width and having a shank end and tip end, said de-icer comprising a body of flexible rubber material for mounting upon the leading edge of a propeller blade with the shank end of the de-icer at the shank end of the blade and the tip end of the de-icer at the tip end of the blade with said body extending about and rearwardly from the leading edge of the blade; a heating unit contained in said body, said heating unit embodying a conductive rubber heating element disposed in the tip end portion of the de-icer and extending about the leading edge portion of the tip end of the propeller blade, the transverse width of said conductive rubber heating element being substantially less than the transverse width of said heating unit, at least one wire-containing heating element forming the remainder of the area of the heating unit, said conductive rubber heating element and said wire containing together embracing substantially the entire area of the rubber body with each type of heating element forming an independent heated surface; and terminal means on each of said heating elements to be connected to a source of electrical energy to supply electrical energy to said heating elements.

5. An airplane propeller blade de-icer of substantially sheet form of greater length than width and having a shank end and tip end, said de-icer comprising a body of flexible rubber material for mounting upon the leading edge of a propeller blade with the shank end of the de-icer at the shank end of the blade and the tip end of the de-icer at the tip end of the blade with said body extending about and rearwardly from the leading edge of the blade; a heating unit contained in said body, said heating unit embodying a conductive rubber heating element disposed about the longitudinal center line of said de-icer and extending inwardly from the tip end toward the shank end of said de-icer to substantially midway between the shank end and the tip end of said de-icer, the transverse width of said conductive rubber heating element being substantially less than the transverse width of said heating unit, at least one wire-containing heating element forming the remainder of the area of the heating unit, said conductive rubber heating element and said wire containing together embracing substantially the entire area of the rubber body with each of said types of heating elements forming independent heated surfaces; and terminal means on each of said heating elements whereby a source of electrical energy may be connected to the terminal means for supplying electrical energy to the heating unit.

References Cited in the file of this patent

UNITED STATES PATENTS

| | | |
|---|---|---|
| 2,401,247 | Hunter | May 28, 1946 |
| 2,407,528 | Antonson | Sept. 10, 1946 |
| 2,464,273 | Tanchel | Mar. 15, 1949 |
| 2,490,433 | Gunning et al. | Dec. 6, 1949 |
| 2,503,457 | Speir et al. | Apr. 11, 1950 |
| 2,552,075 | Van Daam | May 8, 1951 |
| 2,564,325 | Coonly | Aug. 14, 1951 |
| 2,599,059 | Jones | June 3, 1952 |
| 2,669,646 | Ford | Feb. 16, 1954 |

FOREIGN PATENTS

| | | |
|---|---|---|
| 553,597 | Great Britain | May 27, 1943 |